(12) United States Patent
Wang et al.

(10) Patent No.: US 11,787,914 B2
(45) Date of Patent: Oct. 17, 2023

(54) EXPANDABLE MEDIA WITH FLEXIBLE SKIN AS TOOLING FOR COMPOSITE PARTS

(71) Applicant: The Boeing Company, Chicago, IL (US)

(72) Inventors: Xiaoxi Wang, Mukilteo, WA (US); Gary E. Georgeson, Tacoma, WA (US); Jonathan A. Santiago, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 96 days.

(21) Appl. No.: 17/445,183

(22) Filed: Aug. 16, 2021

(65) Prior Publication Data

US 2022/0169820 A1    Jun. 2, 2022

Related U.S. Application Data

(60) Provisional application No. 63/119,956, filed on Dec. 1, 2020.

(51) Int. Cl.
*C08J 9/22* (2006.01)
*C08J 9/236* (2006.01)
*C08J 9/18* (2006.01)

(52) U.S. Cl.
CPC .............. *C08J 9/236* (2013.01); *C08J 9/18* (2013.01); *C08J 2201/032* (2013.01); *C08J 2300/22* (2013.01); *C08J 2300/26* (2013.01)

(58) Field of Classification Search
CPC ........ C08J 9/236; C08J 9/18; C08J 2201/032; C08J 2300/22; C08J 2421/00; C08J 2427/18; C08J 2475/04; C08J 2483/04; C08J 9/06; C08J 9/12; C08J 9/224;
(Continued)

(56) References Cited

U.S. PATENT DOCUMENTS

| | | | |
|---|---|---|---|
| 2012/0228467 A1* | 9/2012 | Wallen | B29C 43/34 264/219 |
| 2016/0229090 A1* | 8/2016 | Wallen | B28B 13/021 |
| 2020/0039156 A1 | 2/2020 | Wang et al. | |

(Continued)

OTHER PUBLICATIONS

Georgeson et al., "Skinned Cell Structures and Methods of Producing the Same," U.S. Appl. No. 16/811,729.

*Primary Examiner* — K. Boyle
(74) *Attorney, Agent, or Firm* — MH2 Technology Law Group LLP

(57) ABSTRACT

A system for curing a composite part, includes a mandrel configured to receive and support the uncured composite part; a plurality of expandable pellets disposed on the uncured composite part; and a mold configured to hold the mandrel, the uncured composite part, and the plurality of expandable pellets, wherein the plurality of expandable pellets are configured to expand and apply a positive pressure to the uncured composite part according to a change in condition or triggering event, and wherein each of the plurality of expandable pellets includes a blowing agent, a polymer matrix configured to hold the blowing agent, and a flexible skin configured to encapsulate the polymer matrix and the blowing agent, wherein the flexible skin is at least partially permeable with respect to the blowing agent or a gas released by the blowing agent.

17 Claims, 7 Drawing Sheets

(58) Field of Classification Search
CPC .... C08J 9/232; C08J 2327/06; C08J 2333/12; B29C 44/445; B29C 70/44; B29C 70/54
See application file for complete search history.

(56) References Cited

U.S. PATENT DOCUMENTS

| | | |
|---|---|---|
| 2020/0207033 A1 | 7/2020 | Wang et al. |
| 2020/0398500 A1 | 12/2020 | Georgeson et al. |
| 2021/0001519 A1 | 1/2021 | Wang et al. |
| 2021/0001571 A1 | 1/2021 | Santiago et al. |
| 2021/0138734 A1 | 5/2021 | Maben et al. |
| 2021/0187876 A1 | 6/2021 | Wang et al. |

* cited by examiner

EXPANDABLE MEDIA WITH FLEXIBLE SKIN AS TOOLING FOR COMPOSITE PARTS

CROSS-REFERENCE TO RELATED APPLICATIONS

This application claims priority to U.S. Provisional Patent Application Ser. No. 63/119,956, filed on Dec. 1, 2020, which is incorporated by reference herein in its entirety.

TECHNICAL FIELD

The present disclosure generally relates to the fabrication of composite parts, and more particularly, with systems and methods for the curing of composite parts using expandable media.

BACKGROUND

Composites are tough, light-weight materials created by combining two or more functional components, such as reinforcing fibers bound in a polymer resin. Composite parts may provide structural strength for vehicles and structures. For example, composite stringers and composite panels may be used in aerospace fabrication.

Fabrication of composite parts commonly requires the application of both pressure and heat to complete the curing and consolidation process of the composite part. For example, a composite part preform may lack structural strength before it is cured. Accordingly, forming tooling may be used to press and hold the preform in a desired shape during a curing and consolidation process. However, pressing and holding a preform in a desired shape may be difficult if the preform includes a complex shape or a cavity. The tooling may be difficult to remove and/or the tooling may have difficulties applying an even pressure to the entire preform.

Accordingly, there is a need for systems and methods for the fabrication of composite parts that enhance the consolidation process and are easier to remove, as well as addressing other possible issues.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities exemplified in the present disclosure may be achieved by providing a system for curing a composite part, including a mandrel configured to receive and support the uncured composite part; a plurality of expandable pellets disposed on the uncured composite part; and a mold configured to hold the mandrel, the uncured composite part, and the plurality of expandable pellets, wherein the plurality of expandable pellets are configured to expand and apply a positive pressure to the uncured composite part according to a change in condition or triggering event, and wherein each of the plurality of expandable pellets includes a blowing agent, a polymer matrix configured to hold the blowing agent, and a flexible skin configured to encapsulate the polymer matrix and the blowing agent, wherein the flexible skin is at least partially permeable with respect to the blowing agent or a gas released by the blowing agent.

The flexible skin may be configured to control the expansion of each of the plurality of expandable pellets.

The flexible skin may control the expansion of each of the plurality of expandable pellets by restricting the escape of the blowing agent or the gas released by the blowing agent.

Controlling the expansion of each of the plurality of expandable pellets may include at least one of expanding each of the plurality of expandable pellets and maintaining the expanded state of each of the plurality of expandable pellets.

The expanded state may be maintained for at least one of 20 minutes, 30 minutes, 40 minutes, 60 minutes, 2 hours, or 5 hours.

The blowing agent may release a gas in response to a change in condition or triggering event and a rate of release of the gas by the blowing agent in response to said change in condition or triggering event may be higher than a rate of escape of the gas through the flexible skin such that each of the plurality of expandable pellets expands or maintains an expanded state.

The polymer matrix may release the blowing agent in response to a change in condition or triggering event and a rate of release of the blowing agent from the polymer matrix in response to said change in condition or triggering event may be higher than a rate of escape of the blowing agent through the flexible skin such that each of the plurality of expandable pellets expands or maintains an expanded state.

The blowing agent may expand in volume in response to a change in condition or triggering event and a rate of escape of the blowing agent through the flexible skin may be such that each of the plurality of expandable pellets expands or maintains an expanded state.

The polymer matrix may include a thermoplastic polymer.

The polymer matrix may include at least one of polyurethane (TPU), polypropylene (PP), polycarbonate (PC), polyetherimide (PEI), polystyrene (PS), polyphenylene sulfide (PPS), polyvinyl chloride (PVC) and poly(methyl methacrylate) (PMMA), Nylon, and Vinyl.

The flexible skin may include a thermoplastic elastomers (TPE).

The flexible skin may include at least one of silicon, rubber, polyurethane (PU), and polyethylene (PE).

The blowing agent may include at least one of a chemical blowing agent and a physical blowing agent.

The chemical blowing agent may be configured to release a gas according to the change in condition or triggering event.

The chemical blowing agent may include at least one of isocyanate, azodicarbonamide, hydrazine, toluenesulfonyl-semicarbaside, sodium bicarbonate, or citric acid.

The physical blowing agent may include a physical agent capable of thermal expansion.

The physical blowing agent may include at least one of an inert non-flammable gas, a flammable gas or hydrocarbon, or water vapor.

The blowing agent may further include a functional additive to further facilitate foaming.

The flexible skin may be configured to allow the recharging of the polymer matrix with blowing agent.

The change in condition or triggering event may include one or more of a change in temperature, a change in pressure, a chemical reaction, or an input of radiative energy.

The foregoing and/or other aspects and utilities exemplified in the present disclosure may also be achieved by providing a method of curing a composite part, including placing an uncured composite part on a mandrel; placing a plurality of expandable pellets on the uncured composite part; expanding the plurality of expandable pellets; applying a positive pressure to the uncured composite part; and curing the uncured composite part, wherein each of the plurality of expandable pellets includes a blowing agent, a polymer matrix configured to hold the blowing agent, and a flexible skin configured to encapsulate the polymer matrix and the blowing agent, wherein the flexible skin is at least partially permeable with respect to the blowing agent or a gas released by the blowing agent, and wherein the flexible skin is configured to control the expansion of each of the plurality of expandable pellets.

The flexible skin may control the expansion of each of the plurality of expandable pellets by restricting the escape of the blowing agent or the gas released by the blowing agent.

The method may further include recharging the plurality of expandable pellets; and re-using the expandable pellets.

The foregoing and/or other aspects and utilities exemplified in the present disclosure may also be achieved by providing an expandable pellet for use in the curing of composite parts, including a blowing agent, a polymer matrix configured to hold the blowing agent, and a flexible skin configured to encapsulate the polymer matrix and the blowing agent, wherein the flexible skin is at least partially permeable with respect to the blowing agent or a gas released by the blowing agent, and wherein the flexible skin is configured to control the expansion of the expandable pellet.

The flexible skin may control the expansion of each of the plurality of expandable pellets by restricting the escape of the blowing agent or the gas released by the blowing agent.

Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
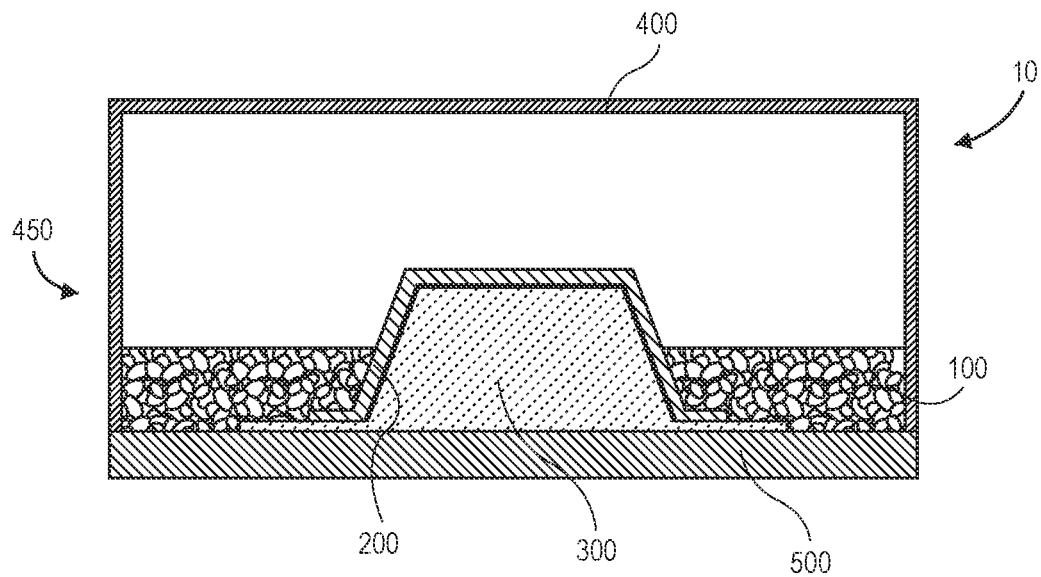
FIGS. 1-2 illustrate a system for curing composites parts according to an implementation of the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described unless the context clearly dictates otherwise. In the specification, the recitation of "at least one of A, B, and C," includes implementations containing A, B, or C, multiple examples of A, B, or C, or combinations of A/B, A/C, B/C, A/B/B/ BB/C, AB/C, etc. In addition, throughout the specification, the meaning of "a," "an," and "the" include plural references. The meaning of "in" includes "in" and "on." Similarly, implementations of the present disclosure may suitably comprise, consist of, or consist essentially of, the elements A, B, C, etc.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

Composite parts, such as Carbon Fiber Reinforced Polymer (CFRP) parts, are initially laid-up in multiple layers that together are referred to as a "preform." As used herein the term "uncured composite part" or "preform" refers to one or more plies of composite materials impregnated with resin. For example, the uncured composite part may be a fiber-reinforced uncured thermoset polymer composite part. Individual fibers within each layer of the preform may be aligned parallel with each other, but different layers may exhibit different fiber orientations to increase a strength of the resulting composite part along different dimensions. The preform may include a viscous resin that solidifies to harden the preform into a composite part (e.g., for use in an aircraft). Carbon fiber plies that has been impregnated with an uncured thermoset resin or a thermoplastic resin are referred to as "pre-preg." As used herein, the term "pre-preg" refers to pre-impregnated stacks of composite plies, such as epoxy impregnated unidirectional composite tape or carbon fiber. A pre-preg may be flexible until it is cured, often by heat and pressure curing or curing within an autoclave. Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

With respect to fiber-reinforced thermoset polymer composite parts, curing generally refers to the application of heat and/or pressure to crosslink and consolidate the fibers of a fiber-reinforced thermoset polymer composite part. While thermoset resins can be partially cured (i.e. crosslinked) without the application of pressure, it often results in a poorly consolidated part. Accordingly, as used herein, the terms "cure" and "curing" include both the application of heat (to cure/crosslink) and the application of pressure (to consolidate) fiber-reinforced thermoset polymer composite parts, such as the thermoset composite parts of the present disclosure.

In some implementations, a composite part is cured by subjecting it to heat and/or pressure. The heat and/or pressure may be applied according to a predetermined cure schedule specifying applied pressures, temperatures, and durations for which the pressures and/or temperatures are maintained. In some implementations, the composite part is cured by pressure alone. For example, the composite part may be cured at room temperature with the application of pressure. The pressure may be positive pressure or negative pressure. For example, the pressure may be applied through vacuum. These schedule temperatures and/or pressures are sometimes referred to as the curing temperature profile and the consolidation pressure profile. As used herein, a "maximum curing temperature" refers to the highest temperature in the curing temperature profile and a "maximum curing pressure" refers to the highest pressure in the consolidation pressure profile.

There is a need for systems and methods for the fabrication of composite parts that enhance the even application of pressure during the consolidation process and are easier to remove, among other things.

In general, systems for curing composites parts according to implementations of the present disclosure include a plurality of expandable pellets or media configured to expand and apply a positive pressure to an uncured composite part during a curing process. Typically, the expandable pellets are disposed on the uncured composite part in an unexpanded state. The expandable pellets may be placed around the uncured composite part and/or within cavities defined by the uncured composite part. During the curing process, the expandable pellets expand applying a positive pressure against the uncured composite part and helping the uncured composite part retain a desired shape during curing.

In general, a system for curing a composite part, includes a mandrel configured to receive and support the uncured composite part and a plurality of expandable pellets disposed on the uncured composite part, wherein the plurality of expandable pellets are configured to expand and apply a positive pressure to the uncured composite part during a curing process.

As described in more detail below, according to implementations of the present disclosure, a system for curing a composite part includes a mandrel configured to receive and support the uncured composite part, a plurality of expandable pellets disposed on the uncured composite part, and a mold configured to hold the mandrel, the uncured composite part, and the plurality of expandable pellets. The plurality of expandable pellets may be configured to expand and apply a positive pressure to the uncured composite part according to a change in condition or triggering event. Each of the plurality of expandable pellets may include a blowing agent, a polymer matrix configured to hold the blowing agent, and a flexible skin configured to encapsulate the polymer matrix and the blowing agent. The flexible skin may be at least partially permeable with respect to the blowing agent or a gas released by the blowing agent. The flexible skin may be configured to restrict the escape of the blowing agent or the gas released by the blowing agent to control the expansion of each of the plurality of expandable pellets.

Figure 2:
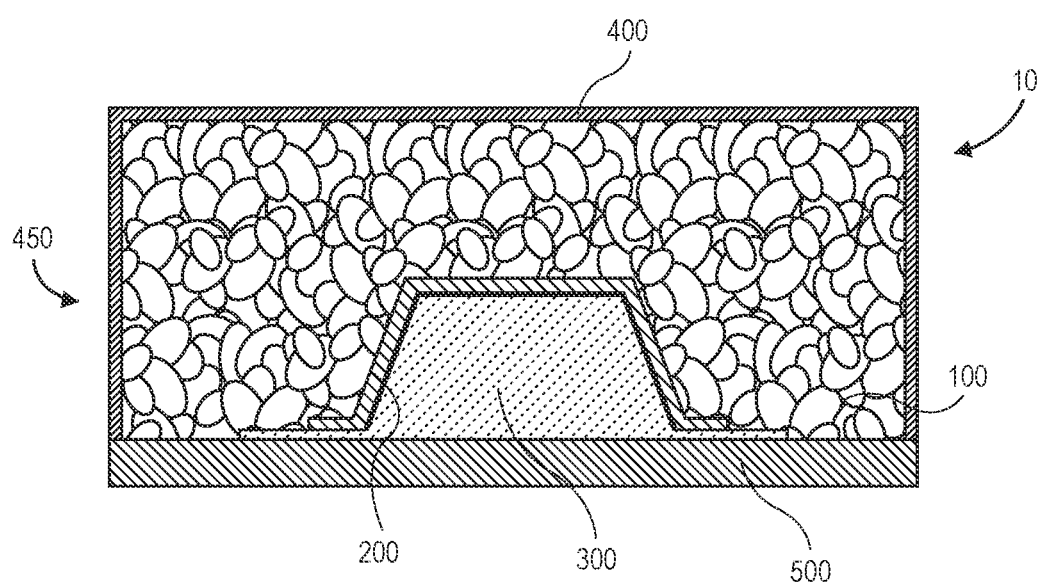

FIGS. 1-2 illustrate a system for curing a composite part according to an implementation of the present disclosure. As illustrated in FIGS. 1-2, a system 10 includes a mold cover 400, a caul plate 500, a mandrel 300, an uncured composite part 200, and a plurality of expandable pellets 100.

In one implementation, the mold cover 400 is configured to attach to the caul plate 500 to form a mold 450. The mold 450 is configured to hold the mandrel 300, the uncured composite part 200, and the plurality of expandable pellets 100. In some implementations, the mold 450 is airtight. In other implementations, the mold 450 is not airtight. For example, the mold 450 may not be separately airtight or capable of holding a consolidation pressure during a curing process. In other examples, the mold 450 is configured to hold the plurality of expandable pellets 100 in an expanded state. The mold 450 may be configured to hold the expandable pellets 100 when expanded such that they can exert a positive pressure on the uncured composite part 200 during a curing process.

While FIGS. 1-2 illustrate the mold 450 as a caul plate 500 and a mold cover 400, the present disclosure is not limited thereto. In other implementations, the mold 450 may be implemented as other devices capable of holding the expandable pellets 100 when expanded such that they can exert a positive pressure on the uncured composite part 200 during a curing process. For example, the mold 450 may be configured as a mesh bag surrounding the mandrel 300, the uncured composite part 200, and the plurality of expandable pellets 100. In other implementations, the mold 450 may be implemented as an airtight or non-airtight oven or an autoclave configured to hold the mandrel 300, the uncured composite part 200, and the plurality of expandable pellets 100.

In one implementation, the mandrel 300 is disposed within the mold 450, and the uncured composite part 200 is laid-up onto an upper surface 330 of the mandrel 300, wherein the plurality of expandable pellets 100 are configured to expand within and against the mold 450 and apply a positive pressure to the uncured composite part 200 during a curing process. For example, as illustrated in FIG. 2, when expanded, the expandable pellets 100 occupy a substantial space within the mold 450 to enforce a desired shape to the uncured composite part 200 during a curing process.

In some implementations, the mandrel 300 may be configured to apply heat to the uncured composite part 200 during a curing process. In some implementations, heat may be applied externally. For example, the system 10 may be placed within a heating oven or autoclave configured to apply heat to the uncured composite part 200 during a curing process. In other implementations, the heat may be applied externally through heat lamps or heating blankets placed over a mesh bag forming the mold 450. In yet other implementations, the curing process may occur at room temperature and the uncured composite part 200 may not be heated.

Figure 3:
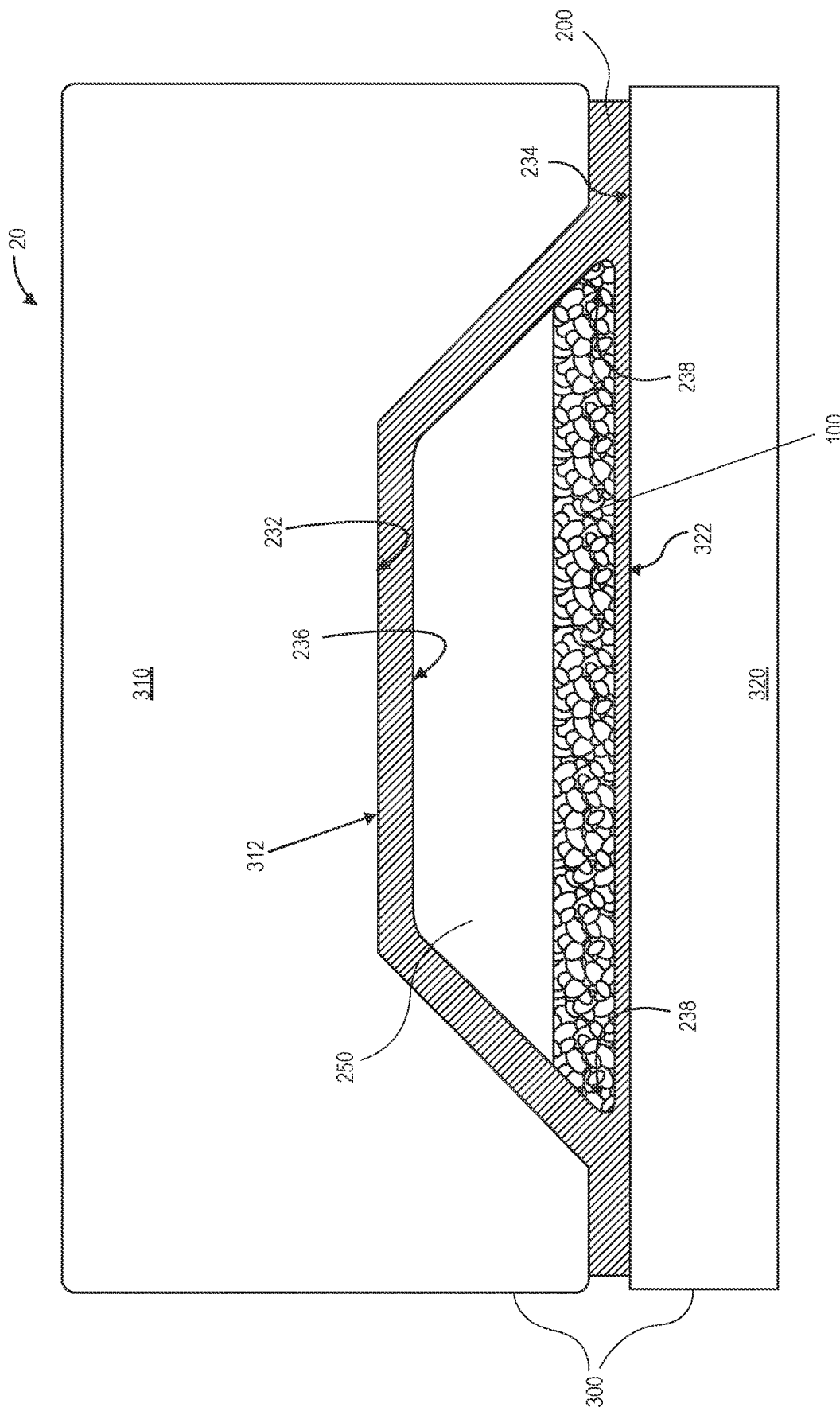
FIGS. 3-4 illustrate a system for curing composites parts according to an implementation of the present disclosure.
Figure 4:
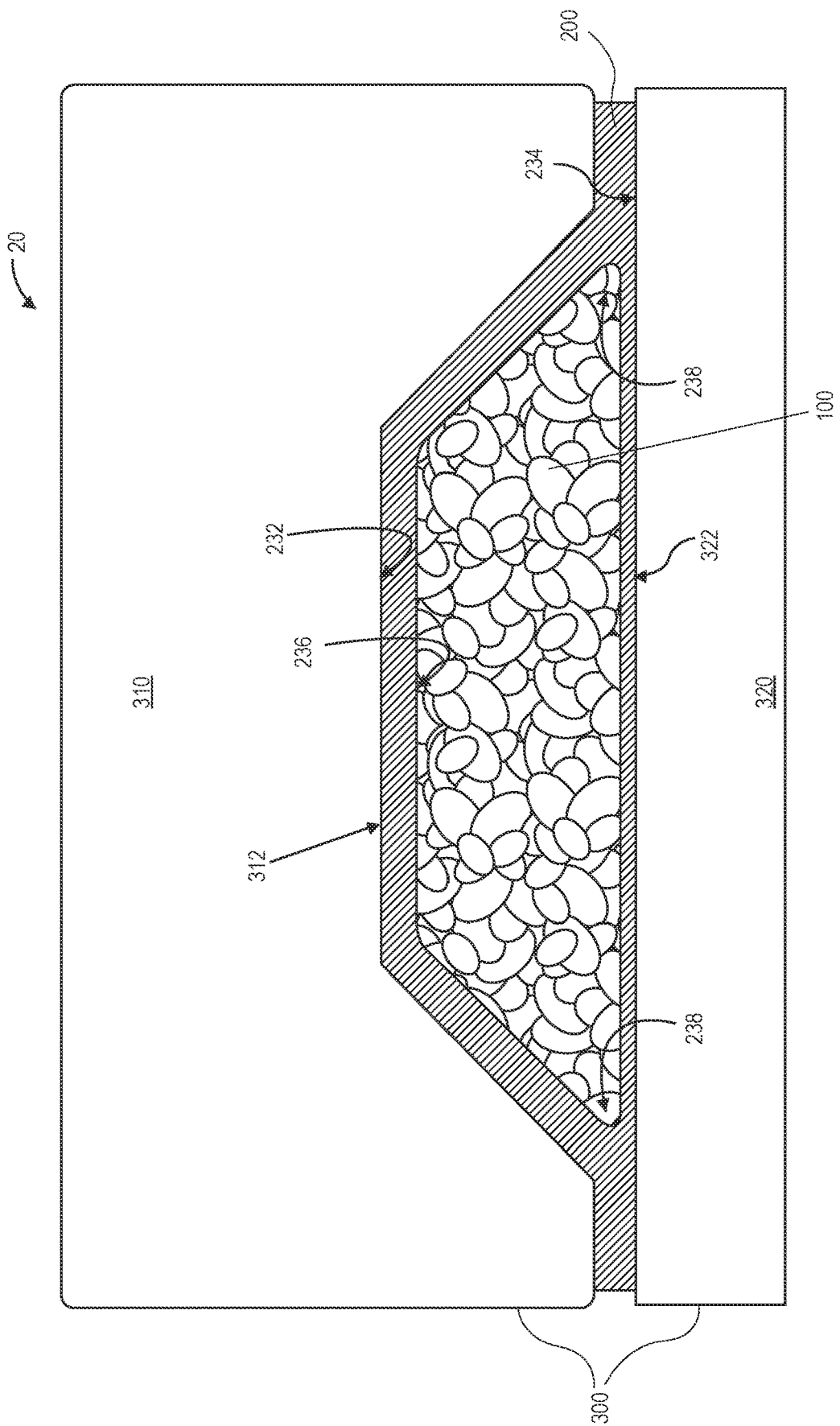

FIGS. 3-4 illustrate a system 20 for curing a composite part according to an implementation of the present disclosure. As illustrated in FIGS. 3-4, a system 20 includes a mandrel 300, an uncured composite part 200, and a plurality of expandable pellets 100.

As illustrated in FIGS. 3-4, the uncured composite part 200 can define one or more internal cavities 250, and the plurality of expandable pellets 100 may be disposed within at least one of the one or more internal cavities 250. The plurality of expandable pellets 100 are configured to expand and at least partially fill the at least one of the one or more internal cavities 250 and apply a positive pressure to the uncured composite part 200 during a curing process.

As illustrated in FIGS. 3-4, the mandrel 300 is configured to receive and support an uncured composite part 200. The mandrel 300 includes an upper mandrel 310 and a lower mandrel 320. An upper portion of the uncured composite part 200 including upper surface 232 may be laid-up onto surface 312 of upper mandrel 310, and a lower portion of the uncured composite part 200 including lower surface 234 may be laid-up onto surface 322 of the lower mandrel 320. Upper mandrel 310 and lower mandrel 320 can then be brought together to enforce a desired shape to the uncured composite part 200 during a curing process.

As illustrated in FIGS. 3-4, the uncured composite part 200 includes an internal cavity 250. The internal cavity 250 can be defined by the boundaries of inner surface 236. As illustrated in FIG. 4, when expanded, the expandable pellets 100 enforce a desired shape to substantially all of the internal cavity 250, including to internal corners 238.

In some implementations, at least one of the upper mandrel 310 and the lower mandrel 320 is configured to heat the uncured composite part 200 during a curing process. In other implementations, the mandrel 300 may not be configured to heat the uncured composite part 200 during a curing process. Instead, heat can be applied externally. For example, the mandrel 300 may be placed within a heating oven or autoclave configured to apply heat to the uncured composite part 200 during a curing process. In other implementations, the curing process may occur at room temperature.

As illustrated in FIGS. 2 and 4, the expandable pellets 100 expand during a curing process. In one implementation, the expandable pellets 100 are configured to expand in response to a predetermined change in condition or triggering event. For example, the expandable pellets 100 can expand in response to a change in temperature, a change in pressure, a chemical reaction, and/or an input of radiative energy (such as, UV light exposure). In some implementations, the expandable pellets 100 expand in response to a single change in condition. For example, a change in temperature. In other implementations, the expandable pellets expand in response to one or more changes in condition or combinations of one or more changes in condition. For example, a change in temperature and a simultaneous change in pressure. Accordingly, the predetermined change in condition includes a change in temperature, a change in pressure, a chemical reaction, and an input of radiative energy (such as, UV light exposure). The predetermined change in condition may also include one or more of a change in temperature, a change in pressure, a chemical reaction, and an input of radiative energy (such as, UV light exposure), and/or combinations thereof.

Figure 5:
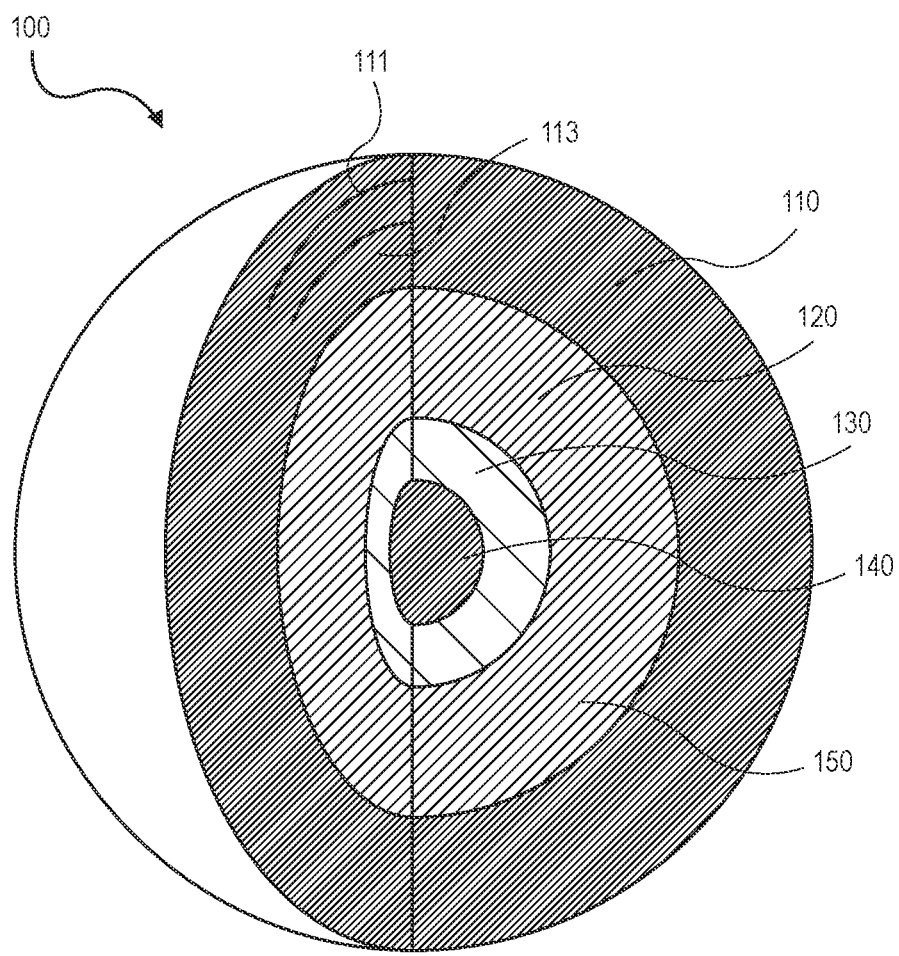
FIG. 5 illustrates an expandable pellet according to an implementation.

FIG. 5 illustrates an expandable pellet according to an implementation. As illustrated in FIG. 5, an expandable pellet 100 includes a flexible skin 110, a polymer matrix 120, and a blowing agent 150. In some implementations, the expandable pellet 100 can further include a core 130 and/or a nucleus 140.

The polymer matrix 120 is configured to hold the blowing agent 150. For example, the polymer matrix 120 may include a free volume within which the blowing agent 150 may be held. In other implementations, the polymer matrix 120 may include a plurality of nanometer-scale voids capable of holding the blowing agent 150. In yet other implementations, the polymer matrix 120 may be formed around or mixed-in with the blowing agent 150. For example, the blowing agent 150 may be a powder, pellets, or a liquid mixed with the polymer matrix 120. In some implementations, the blowing agent 150 can form a core 130 and/or a nucleus 140 around which the polymer matrix 120 is formed. In other implementations, the blowing agent 150 may be dissolved within the polymer matrix 120.

The polymer matrix 120 can include a thermoplastic polymer and/or an elastomeric material. For example, the polymer matrix 120 may include polyurethane (PU), polypropylene (PP), polycarbonate (PC), polyetherimide (PEI), polystyrene (PS), polyphenylene sulfide (PPS), polyvinyl chloride (PVC) and poly(methyl methacrylate) (PMMA), Nylon, Vinyl, etc. In some implementations, the polymer matrix 120 includes high temperature thermoplastic polymers. In other implementations, the polymer matrix 120 includes low temperature thermoplastic polymers.

In some implementations, the polymer matrix 120 includes a single thermoplastic material. For example, the polymer matrix 120 may consist essentially of PMMA. In other implementations, the polymer matrix 120 includes one or more thermoplastic materials or combinations of one or more thermoplastic materials. For example, the polymer matrix may comprise or consist essentially of PVC and PMMA or thermoplastic acrylic-polyvinyl chloride (e.g., Kydex® thermoplastic materials, manufactured by Sekisui SPI, Bloomsburg, Pa.).

The polymer matrix 120 can be configured not to melt during a curing process. Accordingly, in some implementations, a melting point of the polymer matrix is higher than a maximum curing temperature. For example, the polymer matrix 120 may have a melting temperature of at least 150° F., of at least 200° F., of at least 300° F., or of at least 350° F. In other implementations, the polymer matrix may have a melting temperature from about 50° F. to about 850° F., from about 100° F. to about 600° F., or from about 200° F. to about 400° F. In some implementation, a melting point of the polymer matrix 120 is lower than a melting point of the flexible skin 110.

The polymer matrix 120 can be configured to expand according to an activation of the blowing agent 150. That is, the blowing agent 150 may activate according to a predetermined change in condition or triggering event, and the polymer matrix may expand according to an activation of the blowing agent 150 to expand the expandable pellet 100.

In other implementations, the polymer matrix 120 may not expand according to an activation of the blowing agent 150. Instead, the polymer matrix 120 can be configured to release a gas upon activation of the blowing agent 150, and the release of the gas will expand the flexible skin 110 to expand the expandable pellet 100.

The blowing agent 150 can include a gas or liquid configured to react in response to the predetermined change in condition or triggering event. The blowing agent 150 may be a gas or liquid, such as carbon dioxide, nitrogen, one or more hydrocarbons, water, and/or any other suitable physical and/or chemical blowing agent 150 configured to react in response to a predetermined change in condition or triggering event.

In other implementations, the blowing agent 150 may include a gas, a powder, a supercritical gas, and/or other components configured to react in response to a predetermined change in condition or triggering event. The blowing agent 150 may include only one gas, one solid, or one liquid. In other implementations, the blowing agent 150 may include combinations of gasses, solids, or liquids, or combinations of gasses, solids, and liquids.

In one implementation, the flexible skin 110 restricts the escape of the blowing agent 150, or a gas released by the blowing agent 150, when the blowing agent 150 is activated, such that the expandable pellet 100 expands and/or maintains an expanded state. For example, the flexible skin 110 is configured to restrict the escape of the blowing agent 150 or the gas released by the blowing agent 150 to control the expansion of the expandable pellets 100.

In one implementation, controlling the expansion of each of the expandable pellets 100 includes at least one of expanding the expandable pellets 100 and maintaining the expanded state of the expandable pellets 100. The expanded state may be maintained for at least one of 20 minutes, 30 minutes, 40 minutes, 60 minutes, 2 hours, or 5 hours.

In some implementations, the blowing agent 150 releases a gas in response to the change in condition or triggering event and a rate of release of the gas by the blowing agent 150 in response to said change in condition or triggering event is higher than a rate of escape of the gas through the flexible skin 110 such that the expandable pellets 100 expand or maintain an expanded state.

In some implementations, the polymer matrix 120 releases the blowing agent 150 in response to a change in condition or triggering event and a rate of release of the blowing agent 150 from the polymer matrix 120 in response to said change in condition or triggering event is higher than a rate of escape of the blowing agent 150 through the flexible skin 110 such that each of the expandable pellets expand or maintain an expanded state.

In some implementations, the blowing agent 150 expands in volume in response to a change in condition or triggering event and a rate of escape of the blowing agent 150 through the flexible skin 110 is such that the expandable pellets expand or maintain an expanded state.

The blowing agent 150 may be a chemical blowing agent 150 or a physical blowing agent 150. The blowing agent 150 may be a combination of a physical blowing agent 150 and a chemical blowing agent 150, or the blowing agent 150 may consist essentially of a physical blowing agent 150 or a chemical blowing agent 150.

The predetermined change in condition or triggering event can include a change in temperature, a change in pressure, a chemical reaction, an input of radiative energy (such as, UV light exposure), and combinations thereof. For example, a physical blowing agent 150 may enter into a gaseous phase or increase its volume according to a predetermined change in condition, such as a change in temperature. A chemical blowing agent 150 may release a gas according to a change in condition, such as a change in temperature, a chemical reaction, or exposure to UV light.

In some implementations, the predetermined change in condition is a single change in condition. In other implementations, the predetermined change in condition includes one or more changes in condition or combinations of one or more changes in condition.

In some implementations, the blowing agent 150 includes one or more chemical blowing agents 150. The chemical blowing agent 150 can be compounded or mixed in with the polymer matrix 120. For example, the chemical blowing agent 150 may be a powder, pellet, or liquid mixed with the polymer matrix 120. In other implementations, the polymer matrix 120 may act as a carrier for the chemical blowing agent 150.

Upon activation, a chemical blowing agent 150 can be configured to release a gas according to a change in condition or a chemical reaction. At least one of the polymer matrix 120, the flexible skin 110, and the expandable pellet 100 expands according to said release of gas.

The expansion of the expandable pellet 100 can be controlled by the balance between the release of gas by the chemical blowing agent 150 in the polymer matrix 120 and the escape of the gas released by the chemical blowing agent 150 from the expandable pellet 100 through the flexible skin 110. Accordingly, a rate of the gas released by the chemical blowing agent 150 in response to a predetermined change in condition or triggering event is lower than a rate of escape of the gas released by the chemical blowing agent 150 through the flexible skin 110.

In some implementations, the flexible skin 110 is impermeable to the gas released by the chemical blowing agent 150. In other implementations, the gas released by the chemical blowing agent 150 may diffuse through the flexible skin. However, the rate of diffusion through the flexible skin 110 may be lower than the rate of gas released by the chemical blowing agent 150 when activated, such that the expandable pellet 100 expands and/or maintains an expanded state. In one implementation, the flexible skin 110 restricts the escape of gas released by the chemical blowing agent 150 when activated such that the expandable pellet 100 expands and/or maintains an expanded state. For example, the rate of gas release by the blowing agent in response to a predetermined change in condition or triggering event is 2 times higher, 5 times higher, 10 times higher, or 20 times higher than a rate of escape of the gas released by the chemical blowing agent 150 through the flexible skin 110.

In some implementations, the expandable pellet maintains an expanded state during an entire curing cycle. For example, the expandable pellet 100 may remain expanded for at least 10 minutes, for at least 20 minutes, for at least 30 minutes, and for at least 1 hour. The expandable pellet 100 may remain expanded for from about 10 minutes to about 2 hours. The expandable pellet 100 maintains an expanded state at the curing temperature.

A chemical blowing agent 150 may not be rechargeable. That is, once an amount of gas is released according to a change in condition or triggering event, the chemical blowing agent 150 may be spent and no longer capable of producing additional gas.

The chemical blowing agent 150 can include isocyanate, azodicarbonamide, hydrazine, toluenesulfonyl-semicarbaside, sodium bicarbonate, citric acid, and others. Other usable materials for a chemical blowing agent 150 may include benzene sulfonyl hydrazide, 5-phenyltetrazole, dinitrozopentamethylentetraamin.

In other implementations, the blowing agent 150 includes one or more physical blowing agents 150. The physical blowing agent 150 can be mixed in or held by the polymer matrix 120. For example, the physical blowing agent 150 may be a gas held within the free space or interstitial voids of the polymer matrix 120. In some implementations, the polymer matrix 120 may act as a carrier for the physical blowing agent 150 or the physical blowing agent 150 may be dissolved in the polymer matrix 120. For example, a physical blowing agent 150 may be dissolved in the polymer matrix 120 until a saturation state is reached. The physical blowing agent 150 may be activated according to a change in condition or triggering event, such as a change in temperature. For example, an increase in temperature may lower the solubility of the physical blowing agent 150 in the polymer matrix 120, driving the physical blowing agent 150 out of the polymer matrix 120 and/or expand the volume of the physical blowing agent 150. At the same time, the elevated temperature (usually higher than the glass transition temperature Tg of the polymer matrix 120) softens the polymer matrix 120. The oversaturated physical blowing agent 150 may then nucleate in the softened polymer matrix 120 and lead to bubble growth and/or expansion of the polymer matrix 120, increasing the volume of the polymer matrix 120, the flexible skin 110, and the expandable pellet 100.

The expansion of the expandable pellet 100 may be controlled by the balance between the release of physical blowing agent 150 from the polymer matrix 120 and the escape of the physical blowing agent 150 from the expandable pellet 100 through the flexible skin 110. Accordingly, a rate of release of the physical blowing agent 150 from the polymer matrix 120 in response to a predetermined change in condition or triggering event is lower than a rate of escape of the physical blowing agent 150 through the flexible skin 110. For example, the rate of release of physical blowing agent 150 in response to a predetermined change in condition or triggering event is 2 times higher, 5 times higher, 10 times higher, or 20 times higher than a rate of escape of the physical blowing agent 150 through the flexible skin 110.

In some implementations, the flexible skin 110 is impermeable to the physical blowing agent 150. In other implementations, the physical blowing agent 150 may diffuse through the flexible skin 110. However, the rate of diffusion through the flexible skin 110 may be lower than the rate of released of the physical blowing agent 150 from the polymer matrix 120 when activated, such that the expandable pellet 100 expands and/or maintains an expanded state. In one implementation, the flexible skin 110 restricts the escape of the physical blowing agent 150 when activated such that the expandable pellet 100 expands and/or maintains an expanded state. For example, the expandable pellet maintains an expanded state during an entire curing cycle. In some implementations, the expandable pellet 100 may remain expanded for at least 10 minutes, for at least 20 minutes, for at least 30 minutes, and for at least 1 hour. The expandable pellet 100 may remain expanded for from about 10 minutes to about 2 hours. The expandable pellet 100 maintains an expanded state at the curing temperature.

The physical blowing agent 150 can include a physical agent capable of thermal expansion, such as a chlorofluorocarbon, a hydrochlorofluorocarbon, a hydrocarbon, or liquid $CO_2$, water vapor, among others. Other usable materials for a physical blowing agent 150 may include inert non-flammable gases such as carbon dioxide, helium, and nitrogen, flammable gases and materials such as propane, isobutane, pentane, ethanol, DME, LPG, and the like, and chemical blowing agents such as chlorofluorocarbons (CFCs), hydrochlorofluorocarbons (HCFCs), and hydrofluorocarbons (HFCs).

A physical blowing agent 150 can return to its original state after the predetermined change in condition or triggering event. For example, when the physical blowing agent 150 exits the polymer matrix 120 or expands the polymer matrix 120 according to a change in temperature, the physical blowing agent 150 may return to its original condition or volume after it cools. In some implementations, the polymer matrix 120 and the expandable pellet 100 may keep an expanded shape without significant shrinkage after activation of the blowing agent 150. For example, the polymer matrix 120 and the expandable pellet 100 may remain in a plastically deformed and expanded state after the blowing agent 150 returns to its initial state and/or cools down. In other implementations, the polymer matrix 120 and the expandable pellet 100 may collapse or elastically return to their original size and shape after the physical blowing agent 150 returns to its initial state and/or cools down.

In some implementations, the expandable pellets 100 are deformable. For example, an expandable pellet 100 may be at least partially deformable after, during, and/or before reaction of the blowing agent 150. A degree of deformability allows expandable pellets 100 to squeeze into small gaps that might otherwise exist between expandable pellets 100, between expandable pellets 100 and inner or outer surfaces of the uncured composite part 200, and/or between the expandable pellets 100 and the mold 450 or mandrels 300. Filing these gaps allows the plurality of expandable pellets 100 to present a substantially smooth surface to the uncured composite part 200 and more evenly apply a positive pressure to the uncured composite part 200.

The blowing agent 150 can include a functional additive to further facilitate foaming. For example, when the blowing agent 150 includes a gas, the functional additive to further facilitate foaming can be a material that facilitates formation of a foam, such as, a surfactant. Suitable foaming agents may include sodium laureth sulfate (SLS), sodium lauryl ether sulfate (SLES), sodium lauryl sulfate (also known as sodium dodecyl sulfate or SDS), and ammonium lauryl sulfate (ALS), among others.

The blowing agent 150 can be introduced into the expandable pellet 100 under pressure when the blowing agent 150 is a gas or a liquid. The ability of the polymer matrix 120 to hold the blowing agent 150 depends on the solubility of the blowing agent 150 with respect to the polymer matrix 120. Generally, lower temperature leads to lower diffusivity and higher solubility, similarly, higher temperature results in higher diffusivity and lower solubility.

Accordingly, the polymer matrix 120 can be "charged" with the blowing agent 150 at lower temperatures, such as room temperature, for a long period of time (hours to days) in a high pressure environment, for example, at 5 MPa for $CO_2$, so that the polymer matrix 120 will absorb enough gas and reach a steady state with the polymer matrix 120 containing a predetermined gas concentration. When heated, the steady state breaks, and due to the lower solubility, the blowing agent 150 may be driven out of the free volume of the polymer matrix 120 and/or increase in volume, expanding the expandable pellet 100. In some implementations, the polymer matrix 120 acts as a reservoir to hold and release the blowing agent 150. The flexible skin 110 acts as a barrier to slow down the gas diffusion of the blowing agent 150 out of the expandable pellets 100 to allow continuous volume increase of the expandable pellet 100 without collapsing and/or maintain an expanded state of the expandable pellets 100 in response to the change in condition or triggering event.

In one implementation, the flexible skin 110 allows the blowing agent 150 to diffuse through it to charge the polymer matrix. The solubility of the polymer matrix 120 with respect to the blowing agent 150 is high enough to hold an amount of blowing agent 150 sufficient to expand the expandable pellet 100. For example, the polymer matrix 120 is configured to hold sufficient blowing agent 150 such that the expandable pellets 100 can apply a positive pressure to the uncured composite part 200 during a curing process when in an expanded state. For example, the polymer matrix 120 of each expandable pellet 100 may hold sufficient blowing agent 150 to expand the expandable pellet 100 from about 1.2 to about 10 times the original volume of the expandable pellet 100. The polymer matrix 120 may hold sufficient blowing agent 150 to expand the expandable pellet 100 1.2 times, 2 times, 3 times, 4 times, 5 times, 6 times, 7 times, 8 times, 9 times, or 10 times the original volume of the expandable pellet 100. The polymer matrix 120 may hold sufficient blowing agent 150 to expand the expandable pellet 100 at least 2 times, 4 times, 6 times, 8 times, or 10 times the original volume of the expandable pellet 100. The polymer matrix 120 may hold sufficient blowing agent 150 to expand the expandable pellet 100 from about 1.5 times to about 50 times the original volume of the expandable pellet 100.

The charging of the polymer matrix 120 can start at a high temperature such that the blowing agent 150 may quickly diffuse into the polymer matrix 120 via the flexible skin 110. The charging of the polymer matrix 120 may continue at low temperature, such as room temperature, to ensure that more blowing agent 150 is absorbed by the polymer matrix 120.

In some implementations, the expandable pellets 100 may be re-charged after a curing cycle. For example, the physical blowing agent 150 may be rechargeable. That is, the polymer matrix 120 may be recharged with physical blowing agent 150 after a curing cycle. The polymer matrix 120 may be recharged with physical blowing agent 150 in an amount sufficient to replace the blowing agent 150 that escaped through the flexible skin 110 during the curing process. In other implementations, the polymer matrix 120 may be recharged with physical blowing agent 150 in an amount sufficient to expand the expandable pellet 100 from about 1.2 to about 10 times the original volume of the expandable pellet 100.

The flexible skin 110 is configured to encapsulate the polymer matrix 120 and the blowing agent 150. In addition, the flexible skin 110 is also configured to expand. For example, the flexible skin 110 is configured to expand according to an expansion of the polymer matrix 120. In other implementations, the flexible skin 110 is configured to expand according to an expansion of the blowing agent 150 and/or a release of gas by the blowing agent 150. In one implementation, the polymer matrix 120 and the blowing agent 150 expand according to a predetermined change in condition or triggering event as described above. As the flexible skin 110 encapsulating the polymer matrix 120 and the blowing agent 150 expands it increases the volume of the expandable pellet 100.

The flexible skin 110 can be a flexible material with high elongation and high tear resistance properties to prevent tearing during expansion of the expandable pellet 100. For example, the flexible skin 110 may be configured to have a 20% higher break than the polymer matrix 120. In other implementations, the flexible skin 110 may be configure to expand from about 1 to about 10 times its original volume without tearing. For example, the flexible skin 110 may expand to 1.7 times its original volume without tearing.

The flexible skin 110 may include a flexible material such as silicon, rubber, polyurethane (PU), polyethylene (PE), etc. For example, the flexible skin 110 may include a thermoplastic elastomers (TPE), such as thermoplastic polyurethane (TPU).

In some implementations, the flexible skin 110 includes a single flexible material. For example, the flexible skin 110 may consist essentially of TPU. In other implementations, the flexible skin 110 includes one or more flexible materials or combinations of one or more flexible materials. For example, the flexible skin 110 may comprise or consist essentially of silicone and rubber.

The flexible skin 110 can include one or more layers. For example, as illustrated in FIG. 5, the flexible skin 110 may include an outer layer 111 and an inner layer 113. The outer layer 111 may be an exterior layer of the expandable pellet 100 and the inner layer 113 may be in contact with the polymer matrix 120. The flexible skin 110 may include one or more functionalized layers. In some implementations, at least one of the one or more layers is functionalized. For example, a layer may be functionalized to affect the roughness, gloss, bond-ability, texture, and aesthetic appearance of the flexible skin 110. In one implementation, the outer layer 111 may be functionalized to stretch without breaking. In another implementation, the inner layer 113 may be functionalized to enhance an adhesion to the polymer matrix 120.

For example, the flexible skin 110 may be Teflon-coated to reduce an adhesion between the expandable pellets 100, and the outer layer 111 may include PTFE (e.g., Teflon®, commercially available from The Chemours Company, Wilmington, Del.).

The flexible skin 110 is configured not to melt during a curing process. Accordingly, a melting point of the flexible skin 110 is higher than a maximum curing temperature. For example, the flexible skin 110 may have a melting temperature higher than a curing temperature of the uncured composite part 200. In one implementation, the flexible skin 110 has a melting temperature at least 20° F. higher than a curing temperature of the uncured composite part 200. For example, the flexible skin 110 has at least a 370° F. melting temperature for a composite part with a 350° F. curing temperature and the flexible skin 110 has at least a 270° F. melting temperature for a composite part with a 250° F. curing temperature. In some implementations, the melting temperature of the flexible skin 110 is from about 80° F. to about 800° F. For example, the flexible skin 110 may have a melting temperature from about 80° F. to about 270° F., from about 80° F. to about 370° F., or from about 270° F. to about 370° F.

The flexible skin 110 is configured to limit a diffusion of the blowing agent 150 or a gas released by the blowing agent 150 through the flexible skin 110. For example, the flexible skin 110 may be substantially impermeable with respect to the blowing agent 150 or the gas released by the blowing agent 150. In one implementation, the flexible skin 110 is airtight and the blowing agent 150 (or a gas released by the blowing agent 150) cannot substantially diffuse through the flexible skin 110.

In other implementations, the flexible skin 110 is configured to control a diffusion of the blowing agent 150 (or a gas released by the blowing agent 150) through the flexible skin 110 to maintain a pressure within the expandable pellet 100. For example, the flexible skin 110 is at least partially permeable with respect to the blowing agent 150 or the gas released by the blowing agent 150. The flexible skin 110 may be configured to allow blowing agent 150 (or a gas released by the blowing agent 150) to diffuse out of the expandable pellet 100 to maintain a predetermined pressure within the expandable pellet 100 in response to the predetermined change in condition.

In other implementations, the flexible skin 110 is at least partially permeable with respect to the blowing agent 150 to allow for recharging of the expandable pellet 100 as described above. For example, the flexible skin 110 may be configured to allow the recharging of the polymer matrix 120 with blowing agent 150.

As illustrated in FIG. 5, in some implementations the expandable pellet 100 may include a core 130. The core 130 may be core configured to enhance a formation of the expandable pellet 100. In some implementations, the blowing agent 150 may form the core 130. For example, the core 130 may serve as a base to facilitate formation of the polymer matrix 120 and the flexible skin 110 surrounding the core 130. In other implementations, the core 130 may be configured to enhance removal of the expandable pellet 100. For example, the core 130 may include a metal nucleus 140 to facilitate the magnetic removal of the expandable pellets 100 from the system 10. In other implementations, the core 130 may include a plurality of metallic particles (not illustrated) to facilitate the magnetic removal of the expandable pellets 100 from the system 10.

The core 130 can include a polymer material, such as polycarbonate (PC), polyethylene terephthalate (PET), polystyrene (PS), polyethylene (PE), polypropylene (PP), polyetherimide (PEI), etc.

The metal nucleus 140 may include magnetically attractable materials or particles, such as Fe, Co, and Ni. In other implementations, at least one of the core 130 or the nucleus 140 include ferromagnetic materials. In some implementations, the metal nucleus 140 comprises metal particles incorporated into the polymer material forming the core 130.

Each expandable pellet 100 has an average particle size from about 0.5 mm to about 10 mm. For example, an expandable pellet 100 may have an average particle size from about 1 mm to about 5 mm, from about 1.5 mm to about 2.5 mm, or of about 2 mm.

Figure 6:
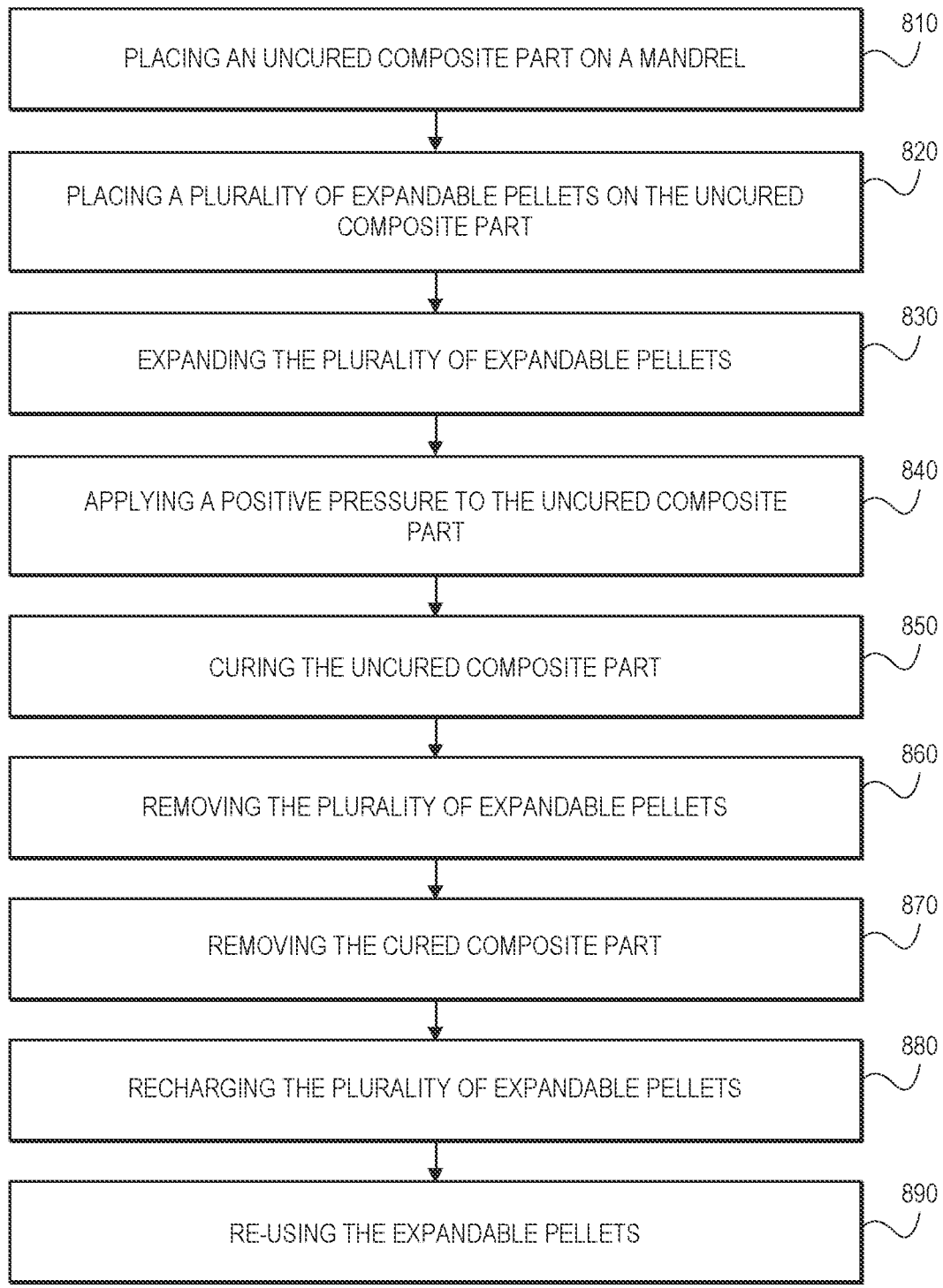
FIG. 6 illustrates a method for curing composites parts according to an implementation.

FIG. 6 illustrates a method for curing composites parts according to an implementation. FIG. 6 illustrates an example of a method that, for instance, could be used with the systems 10 and/or 20 described above and as illustrated in FIG. 1-5. As such, the discussion below will reference various components as illustrated in FIG. 1-5.

As illustrated in FIG. 6, a method 800 for curing a composite part 200 begins with placing an uncured composite part 200 on a mandrel 300 in operation 810. For example, the uncured composite part 200 may be placed between an upper mandrel 310 and a lower mandrel 320 forming the mandrel 300. The mandrel 300 may shape the uncured composite part 200. The mandrel 300 may apply heat to the uncured composite part 200 during a curing process. In some implementations, the uncured composite part 200 is placed within a mold 450 holding the mandrel 300. The mold 450 is configured to hold the plurality of expandable pellets 100, such that the plurality of expandable pellets 100 can apply a positive pressure to the uncured composite part 200 when expanded. The mold 450 may not be airtight.

Operation 820 includes placing a plurality of expandable pellets 100 on the uncured composite part 200. The plurality of expandable pellets 100 may be placed around the uncured composite part 200. In other implementations, the uncured composite part 200 defines one or more internal cavities 250 and the plurality of expandable pellets 100 may be placed inside the one or more internal cavities 250.

Each of the plurality of expandable pellets 100 may include a blowing agent 150, a polymer matrix 120 configured to hold the blowing agent 150, and a flexible skin 110 configured to encapsulate the polymer matrix 120 and the blowing agent 150. In some implementations, all of the plurality of expandable pellets 100 use the same material for the blowing agent, 150, use the same material for the polymer matrix 120, and/or use the same material for the flexible skin 110. In other implementations, the plurality of expandable pellets 100 can use different materials for the blowing agent 150, can use different materials for the polymer matrix 120, and/or can use different materials for the flexible skin 110. The flexible skin 110 may be at least partially permeable with respect to the blowing agent 150 or a gas released by the blowing agent 150. The flexible skin 110 may be configured to restrict the escape of the blowing agent 150 or the gas released by the blowing agent 150 to control the expansion of each of the plurality of expandable pellets 100.

Operation 830 includes expanding the plurality of expandable pellets 100. In one implementation, the plurality of expandable pellets 100 expand in response to a predetermined change in condition or triggering event. For example, the plurality of expandable pellets 100 may be configured to expand in response to a change in temperature.

Operation 840 includes applying a positive pressure to the uncured composite part 200. For example, as the plurality of expandable pellets 100 expand, they apply a positive pressure to the uncured composite part 200. In some implementations, the plurality of expandable pellets 100 at least partially deform to squeeze into small gaps between the plurality of expandable pellets 100, between the plurality of expandable pellets 100 and inner or outer surfaces of the uncured composite part 200, and/or between the plurality of expandable pellets 100 and the mold 450 or mandrel 300 as the plurality of expandable pellets 100 expand.

Operation 850 includes curing the uncured composite part 200. For example, the curing part 200 may be subject to a combination of heat and pressure configured to cure the uncured composite part 200. In some implementations, the uncured composite part 200 is subject to a predetermined curing temperature profile and a consolidation pressure profile to cure the uncured composite part 200. In some implementations, the uncured composite part 200 is cured while the plurality of expandable pellets 100 apply a positive pressure to the uncured composite part 200. The expandable pellets 100 may be configured to maintain an expanded state throughout the curing cycle. For example, the expandable pellets 100 may be configured to maintain their expanded state for at least 5 minutes, at least 10 minutes, at least 20 minutes, at least 1 hour, and at least 2 hours. In some implementations, the mandrel 300 is configured to apply a curing temperature to the uncured composite part 200. In some implementations, the mandrel 300 is configured to apply a consolidation pressure to the uncured composite part 200. In other implementations, the plurality of expandable pellets 100 apply a consolidation pressure to the uncured composite part 200. In some implementations, the expandable pellets 100 are the only source of a consolidation pressure applied to the uncured composite part 200.

Operation 860 includes removing the plurality of expandable pellets 100. For example, the plurality of expandable pellets 100 may include a magnetic nucleus and be removed magnetically. In other implementations, the plurality of expandable pellets 100 may be physically removed, for example, by a vacuum hose or blower. In some implementations, the plurality of expandable pellets 100 are shrunk before removal. The plurality of expandable pellets 100 may be configured to shrink after the predetermined change in condition or triggering event is removed. For example, if the plurality of expandable pellets 100 expand in response to a change in temperature, the plurality of expandable pellet 100 may collapse or elastically return to their original size and shape after they cool down. In other implementations, the plurality of expandable pellets 100 remain in a plastically deformed and expanded state after they cools down. In some implementations, shrinking the expanded plurality of expandable pellets 100 comprises cooling the plurality of expandable pellets 100.

Operation 870 includes removing the cured composite part 200. After curing, the now cured composite part 200 is removed from the mandrel 300 in operation 860.

In some implementations, the method 800 further includes recharging the plurality of expandable pellets 100 in operation 880. For example, flexible skins 110 of the plurality of expandable pellets 100 may be partially permeable with respect to a blowing agent 150 and the plurality of expandable pellets 100 may be placed in a vessel containing a high pressure of blowing agent 150 to allow the blowing agent 150 to diffuse through the flexible skin 110 and recharge the expandable pellet 100 with blowing agent 150. Method 800 may then also include re-using the expandable pellets 100 in operation 890. For example, after the cured composite part 200 is removed, at least one of the plurality of expandable pellets 100 may be shrunk, removed, and recharged as described in operations 860-880 above, and used again in operation 820 to cure another uncured composite part 200.

Figure 7:
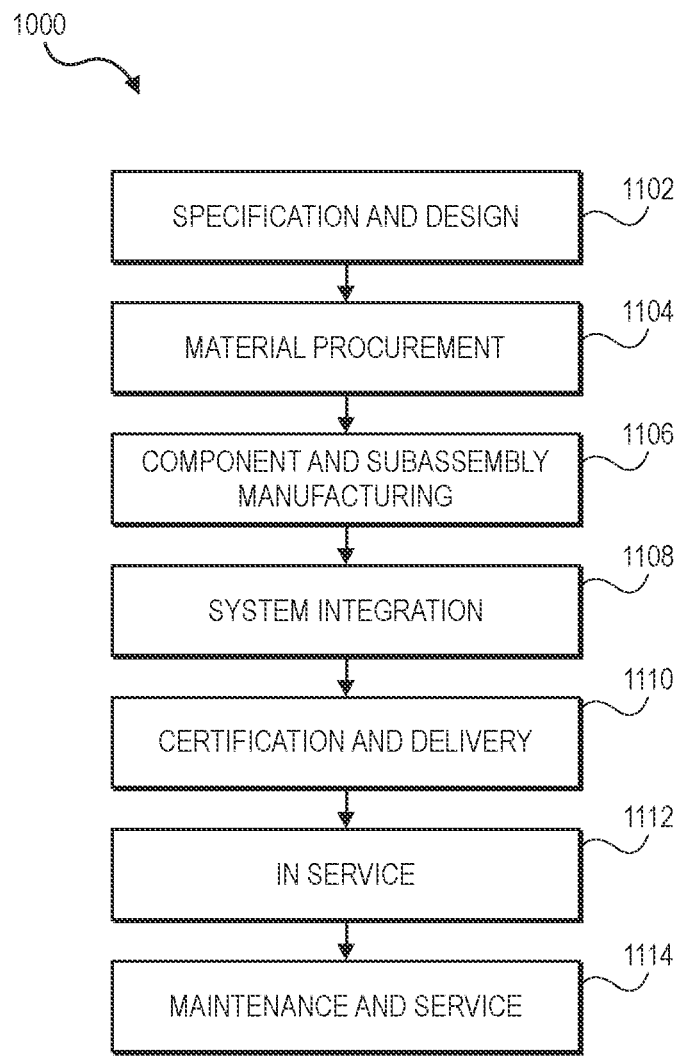
FIG. 7 illustrates a flow diagram of aircraft production and service methodology.
Figure 8:
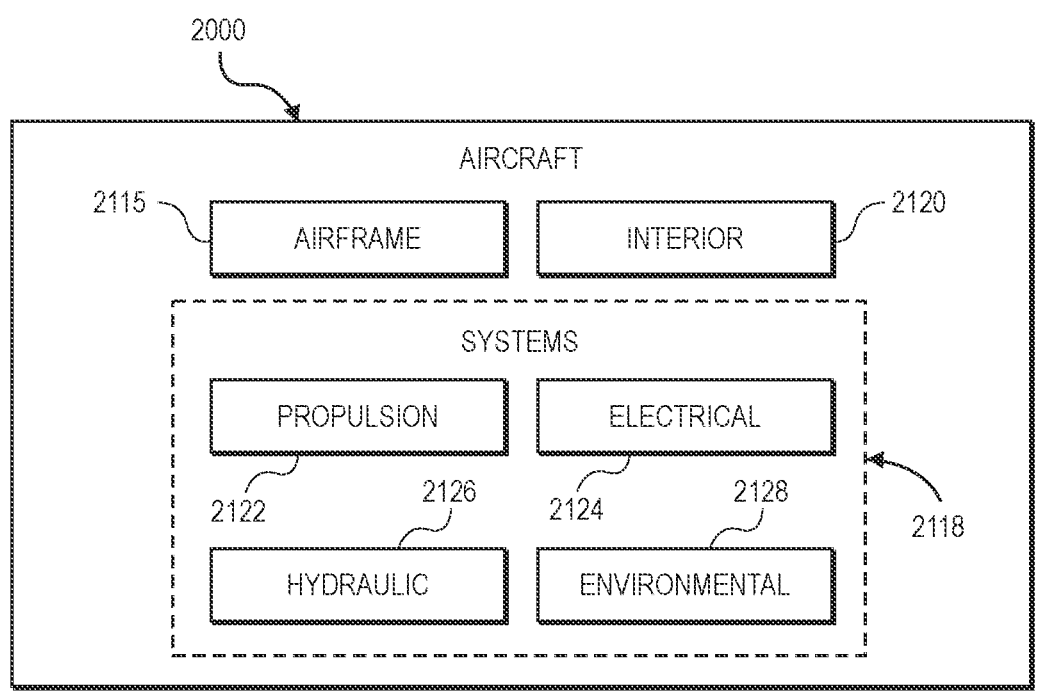
FIG. 8 illustrates a block diagram of an aircraft.

Implementations of the present disclosure may find use in a variety of potential applications, particularly in the transportation industry, including for example, aerospace, marine, automotive applications, and other application where curing of composite parts are desired. Thus, referring now to FIGS. 7 and 8, implementations of the disclosure may be used in the context of an aircraft manufacturing and service method 1000 as shown in FIG. 7 and an aircraft 2000 as shown in FIG. 8. During pre-production, exemplary method 1000 may include specification and design 1102 of the aircraft 2000 and material procurement 1104. During production, component and subassembly manufacturing 1106 and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 2000 produced by exemplary method 1000 may include an airframe 2115 with a plurality of systems 2118 and an interior 2120. Examples of systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Further, the disclosure comprises examples according to the following clauses:

Clause 1. A system for curing a composite part, comprising: a mandrel configured to receive and support an uncured composite part; a plurality of expandable pellets disposed on the uncured composite part; and a mold configured to hold the mandrel, the uncured composite part, and the plurality of expandable pellets, wherein the plurality of expandable pellets are configured to expand and apply a positive pressure to the uncured composite part according to a change in condition or triggering event, and wherein each of the plurality of expandable pellets comprises: a blowing agent, a polymer matrix configured to hold the blowing agent, and a flexible skin configured to encapsulate the polymer matrix and the blowing agent, wherein the flexible skin is at least partially permeable with respect to the blowing agent or a gas released by the blowing agent.

Clause 2. The system of Clause 1, wherein the flexible skin is configured to control an expansion of each of the plurality of expandable pellets.

Clause 3. The system of Clause 2, wherein controlling the expansion of each of the plurality of expandable pellets comprises at least one of expanding each of the plurality of expandable pellets and maintaining an expanded state of each of the plurality of expandable pellets.

Clause 4. The system of Clause 3, wherein the expanded state is maintained for at least one of 20 minutes, 30 minutes, 40 minutes, 60 minutes, 2 hours, or 5 hours.

Clause 5. The system of Clause 3 or 4, wherein the blowing agent releases a gas in response to a change in condition or triggering event and wherein a rate of release of the gas by the blowing agent in response to said change in condition or triggering event is higher than a rate of escape of the gas through the flexible skin such that each of the plurality of expandable pellets expands or maintains an expanded state.

Clause 6. The system of any of Clauses 3-5, wherein the polymer matrix releases the blowing agent in response to a change in condition or triggering event and wherein a rate of release of the blowing agent from the polymer matrix in response to said change in condition or triggering event is higher than a rate of escape of the blowing agent through the flexible skin such that each of the plurality of expandable pellets expands or maintains an expanded state.

Clause 7. The system of any of Clauses 3-6, wherein the blowing agent expands in volume in response to a change in condition or triggering event and a rate of escape of the blowing agent through the flexible skin is such that each of the plurality of expandable pellets expands or maintains an expanded state.

Clause 8. The system of any of Clauses 1-7, wherein the polymer matrix comprises a thermoplastic polymer.

Clause 9. The system of Clause 8, wherein the polymer matrix comprises at least one of polyurethane (TPU), polypropylene (PP), polycarbonate (PC), polyetherimide (PEI), polystyrene (PS), polyphenylene sulfide (PPS), polyvinyl chloride (PVC) and poly(methyl methacrylate) (PMMA), Nylon, and Vinyl.

Clause 10. The system of any of Clauses 1-9, wherein the flexible skin comprises a thermoplastic elastomers (TPE).

Clause 11. The system of any of Clauses 1-10, wherein the flexible skin comprises at least one of silicon, rubber, polyurethane (PU), and polyethylene (PE).

Clause 12. The system of any of Clauses 1-11, wherein the blowing agent comprises at least one of a chemical blowing agent and a physical blowing agent.

Clause 13. The system of Clause 12, wherein the chemical blowing agent is configured to release a gas according to the change in condition or triggering event.

Clause 14. The system of Clause 13, wherein the chemical blowing agent comprises at least one of isocyanate, azodicarbonamide, hydrazine, toluenesulfonyl-semicarbaside, sodium bicarbonate, or citric acid.

Clause 15. The system of Clause 12, wherein the physical blowing agent comprises a physical agent capable of thermal expansion.

Clause 16. The system of any of Clauses 1-15, wherein the flexible skin is configured to allow recharging of the polymer matrix with blowing agent.

Clause 17. The system of any of Clauses 10-16, wherein the change in condition or triggering event comprises one or more of a change in temperature, a change in pressure, a chemical reaction, or an input of radiative energy.

Clause 18. A method of curing a composite part, comprising: placing an uncured composite part on a mandrel; placing a plurality of expandable pellets on the uncured composite part; expanding the plurality of expandable pellets; applying a positive pressure to the uncured composite part; and curing the uncured composite part, wherein each of the plurality of expandable pellets comprises: a blowing agent, a polymer matrix configured to hold the blowing agent, and a flexible skin configured to encapsulate the polymer matrix and the blowing agent, wherein the flexible skin is at least partially permeable with respect to the blowing agent or a gas released by the blowing agent, and wherein the flexible skin is configured to restrict an escape of the blowing agent or the gas released by the blowing agent to control an expansion of each of the plurality of expandable pellets.

Clause 19. The method of Clause 18, further comprising: recharging the plurality of expandable pellets; and re-using the expandable pellets.

Clause 20. An expandable pellet for use in the curing of composite parts, comprising: a blowing agent, a polymer matrix configured to hold the blowing agent, and a flexible skin configured to encapsulate the polymer matrix and the blowing agent, wherein the flexible skin is at least partially permeable with respect to the blowing agent or a gas released by the blowing agent, and wherein the flexible skin is configured an expansion of the expandable pellet.

Systems and methods exemplified herein may be employed during any one or more of the stages of the aircraft manufacturing and service method 1000. For example, components or subassemblies corresponding to production process 1106 may be fabricated or manufactured in a manner similar to components or subassemblies produced while the aircraft 2000 is in service. Also, one or more apparatus examples, method examples, or a combination thereof may be utilized during the production stages 1106 and the 1108, for example, by substantially expediting assembly of or reducing the cost of an aircraft 2000. Similarly, one or more of apparatus examples, method examples, or a combination thereof may be utilized while the aircraft 2000 is in service, for example and without limitation, to maintenance and service 1114.

While FIGS. 7 and 8 describe the disclosure with respect to aircraft and aircraft manufacturing and servicing, the present disclosure is not limited thereto. The systems and methods of the present disclosure may also be used for spacecraft, satellites, submarines, surface ships, automobiles, tanks, trucks, power plants, and any other suitable type of objects.

The present disclosure has been described with reference to exemplary implementations. Although a few implementations have been shown and described, it will be appreciated by those skilled in the art that changes can be made in these implementations without departing from the principles and spirit of preceding detailed description. It is intended that the present disclosure be construed as including all such modifications and alterations insofar as they come within the scope of the appended claims or the equivalents thereof

What is claimed is:

1. A system for curing a composite part, comprising:
a mandrel configured to receive and support an uncured composite part;
a plurality of expandable pellets disposed on the uncured composite part; and
a mold configured to hold the mandrel, the uncured composite part, and the plurality of expandable pellets within the mold,
wherein the plurality of expandable pellets are configured to expand within and against the mold and apply a positive pressure to the uncured composite part according to a change in condition or triggering event, and
wherein each of the plurality of expandable pellets comprises:
a blowing agent,
a polymer matrix configured to hold the blowing agent, and
a flexible skin configured to encapsulate the polymer matrix and the blowing agent, wherein the flexible skin is at least partially permeable with respect to the blowing agent or a gas released by the blowing agent.

2. The system of claim 1, wherein the flexible skin is configured to control an expansion of each of the plurality of expandable pellets.

3. The system of claim 2, wherein controlling the expansion of each of the plurality of expandable pellets comprises at least one of expanding each of the plurality of expandable pellets and maintaining an expanded state of each of the plurality of expandable pellets.

4. The system of claim 3, wherein the expanded state is maintained for at least one of 20 minutes, 30 minutes, 40 minutes, 60 minutes, 2 hours, or 5 hours.

5. The system of claim 3, wherein the blowing agent releases a gas in response to a change in condition or triggering event and wherein a rate of release of the gas by the blowing agent in response to said change in condition or triggering event is higher than a rate of escape of the gas through the flexible skin such that each of the plurality of expandable pellets expands or maintains an expanded state.

6. The system of claim 3, wherein the polymer matrix releases the blowing agent in response to a change in condition or triggering event and wherein a rate of release of the blowing agent from the polymer matrix in response to said change in condition or triggering event is higher than a rate of escape of the blowing agent through the flexible skin such that each of the plurality of expandable pellets expands or maintains an expanded state.

7. The system of claim 3, wherein the blowing agent expands in volume in response to a change in condition or triggering event and a rate of escape of the blowing agent through the flexible skin is such that each of the plurality of expandable pellets expands or maintains an expanded state.

8. The system of claim 1, wherein the polymer matrix comprises a thermoplastic polymer.

9. The system of claim 8, wherein the polymer matrix comprises at least one of polyurethane (TPU), polypropylene (PP), polycarbonate (PC), polyetherimide (PEI), polystyrene (PS), polyphenylene sulfide (PPS), polyvinyl chloride (PVC) and poly(methyl methacrylate) (PMMA), Nylon, and Vinyl.

10. The system of claim 1, wherein the flexible skin comprises a thermoplastic elastomers (TPE).

11. The system of claim 1, wherein the flexible skin comprises at least one of silicon, rubber, polyurethane (PU), and polyethylene (PE).

12. The system of claim 1, wherein the blowing agent comprises at least one of a chemical blowing agent and a physical blowing agent.

13. The system of claim 12, wherein the chemical blowing agent is configured to release a gas according to the change in condition or triggering event.

14. The system of claim 13, wherein the chemical blowing agent comprises at least one of isocyanate, azodicarbonamide, hydrazine, toluenesulfonyl-semicarbaside, sodium bicarbonate, or citric acid.

15. The system of claim 12, wherein the physical blowing agent comprises a physical agent capable of thermal expansion.

16. The system of claim 1, wherein the flexible skin is configured to allow recharging of the polymer matrix with blowing agent.

17. The system of claim 10, wherein the change in condition or triggering event comprises one or more of a change in temperature, a change in pressure, a chemical reaction, or an input of radiative energy. ndable pellet.

* * * * *